United States Patent
Yi et al.

(10) Patent No.: US 12,060,485 B2
(45) Date of Patent: Aug. 13, 2024

(54) LOW GLOSS NON-COATING THERMOPLASTIC RESIN COMPOSITION, METHOD FOR MANUFACTURING MOLDED ARTICLE BY USING THE SAME, AND MOLDED ARTICLE MANUFACTURED THROUGH THE SAME

(71) Applicants: Hyundai Motor Company, Seoul (KR); Kia Motors Corporation, Seoul (KR); Samyang Corporation, Seoul (KR)

(72) Inventors: Seul Yi, Seoul (KR); Boo Youn An, Busan (KR); Dae Sik Kim, Gyeonggi-do (KR); Kyeong Hoon Jang, Seoul (KR); Min Woo Kwon, Seoul (KR); In Soo Han, Gyeonggi-do (KR); Jin Gi Ahn, Seoul (KR); Do Young Bae, Daejeon (KR); Hyung Jin Roh, Daejeon (KR); Tae Jin An, Daejeon (KR); Jung Kyu Han, Sejong (KR); Chul Jin Jo, Daejeon (KR); Si Uk Cheon, Daejeon (KR); Suk Woo Kang, Gangwon-do (KR)

(73) Assignees: Hyundai Motor Company, Seoul (KR); Kia Motors Corporation, Seoul (KR); Samyang Corporation, Seoul (KR)

(*) Notice: Subject to any disclaimer, the term of this patent is extended or adjusted under 35 U.S.C. 154(b) by 419 days.

(21) Appl. No.: 17/108,839

(22) Filed: Dec. 1, 2020

(65) Prior Publication Data
US 2021/0332235 A1    Oct. 28, 2021

(30) Foreign Application Priority Data

Apr. 27, 2020   (KR) .................. 10-2020-0050495

(51) Int. Cl.
| C08L 69/00 | (2006.01) |
| B29B 9/06 | (2006.01) |
| B29K 69/00 | (2006.01) |
| B29K 507/04 | (2006.01) |
| C08J 3/22 | (2006.01) |
| C08L 67/02 | (2006.01) |
| C08L 83/14 | (2006.01) |

(52) U.S. Cl.
CPC ............ *C08L 69/00* (2013.01); *B29B 9/06* (2013.01); *C08J 3/226* (2013.01); *C08L 67/02* (2013.01); *C08L 83/14* (2013.01); *B29K 2069/00* (2013.01); *B29K 2507/04* (2013.01); *C08L 2205/035* (2013.01); *C08L 2207/53* (2013.01); *C08L 2310/00* (2013.01)

(58) Field of Classification Search
None
See application file for complete search history.

(56) References Cited

U.S. PATENT DOCUMENTS

| 3,218,372 | A | 11/1965 | Okamura et al. |
| 4,188,314 | A | 2/1980 | Fox et al. |
| 4,391,954 | A | 7/1983 | Scott |
| 4,634,737 | A | 1/1987 | Liu et al. |
| 2001/0049424 | A1 | 12/2001 | Petiniot et al. |
| 2007/0010635 | A1* | 1/2007 | Chen .............. C08L 69/00 525/476 |
| 2014/0350163 | A1* | 11/2014 | Kim .............. H01L 33/60 524/497 |
| 2018/0037730 | A1* | 2/2018 | Lee .............. C08L 25/16 |
| 2018/0251635 | A1* | 9/2018 | Sohn ............. C08L 69/00 |

FOREIGN PATENT DOCUMENTS

| CN | 101163744 A | 4/2008 |
| CN | 107686624 A | 2/2018 |
| CN | 107922716 A | 4/2018 |
| EP | 1987101 A2 | 11/2008 |
| EP | 3342822 A1 | 7/2018 |
| JP | 2017155107 A * | 9/2017 |
| KR | 101741174 B1 | 5/2017 |
| WO | 2007008634 A2 | 1/2007 |

OTHER PUBLICATIONS

Machine translation of Hirono et al. (JP2017155107) Sep. 7, 2017 (Year: 2017).*

* cited by examiner

*Primary Examiner* — Robert T Butcher
(74) *Attorney, Agent, or Firm* — Fox Rothschild LLP

(57) ABSTRACT

The present invention relates to a non-coating thermoplastic resin composition, a method for manufacturing a molded article by using the same, and a molded article manufactured by the same. More specifically, the present invention is characterized by providing the thermoplastic resin composition which contains polycarbonate, polysiloxane-polycarbonate copolymer, polyester, master-batched carbon black, and additives in specific contents and the molded article, which has excellent chemical resistance, mechanical properties, light resistance, hydrolysis resistance, and low glossiness, manufactured by using the same.

14 Claims, No Drawings

LOW GLOSS NON-COATING THERMOPLASTIC RESIN COMPOSITION, METHOD FOR MANUFACTURING MOLDED ARTICLE BY USING THE SAME, AND MOLDED ARTICLE MANUFACTURED THROUGH THE SAME

CROSS-REFERENCE TO RELATED APPLICATION

This application claims under 35 U.S.C. § 119(a) the benefit of priority to Korean Patent Application No. 10-2020-0050495 filed on Apr. 27, 2020, the entire contents of which are incorporated herein by reference.

TECHNICAL FIELD

The present invention relates to a non-coating thermoplastic resin composition, a method for manufacturing a molded article by using the same, and a molded article manufactured through the same. More specifically, the thermoplastic resin composition which includes polycarbonate, polysiloxane-polycarbonate copolymer, polyester, master-batched carbon black, and additives and the molded article the same may have excellent chemical resistance, mechanical properties, light resistance, hydrolysis resistance, and low glossiness.

BACKGROUND

Since a polycarbonate resin composition exhibits improved processability while maintaining excellent impact resistance, heat resistance, and mechanical strength, the polycarbonate resin composition has been generally used in vehicle components, computer housings, or housings for other office instruments, which may require paint characteristics and excellent processability due to the characteristics of these applications.

In recent years, in the fields of vehicles, electrical and electronics, industrial material components, and the like, there increases the demand for development for materials which are lightweight and have various functionalities, such that the utilization of the resin, such as a plastic component, has been increasing in conventional metal and cross-linked rubber components. Particularly, there have been attempts to improve the properties of the polycarbonate by blending other thermoplastic resins with the polycarbonate (PC) resin having excellent mechanical properties, impact resistance, and heat resistance.

The above information disclosed in this Background section is only for enhancement of understanding of the background of the invention and accordingly it may contain information that does not form the prior art that is already known in this country to a person of ordinary skill in the art.

SUMMARY

In preferred aspects, provided area thermoplastic resin composition and a vehicle molded article including the same, which may be used for non-coating interior and exterior materials for a vehicle or the like which exhibit improved chemical resistance, hydrolysis resistance, and light resistance while satisfying mechanical properties such as impact resistance and heat resistance, and also have an excellent injection appearance.

The object of the present invention is not limited to the aforementioned object. The object of the present invention will be more apparent from the following description, and will be realized by means described in the claims and combinations thereof.

In one aspect, provided is a thermoplastic resin composition including a polycarbonate; a polysiloxane-polycarbonate copolymer; a polyester; and a carbon black.

Preferably, a master batch may include the carbon black.

The term "master batch" as used herein refers to a mixture or a concentrated mixture of additives (e.g., solid additives) to be added into a polymer or resin for manufacturing plastic in order to improve dispersions of the additives. Exemplary master batch can be formed by mixing a compounded material and a carrier resin that may be compatible (e.g. having similar dispersion or miscibility) with a resin base to which the master batch is added. For example, the master batch may include a compounded carbon black and a polycarbonate (e.g., as a carrier resin).

The thermoplastic resin composition may further include an additive distinct from the polycarbonate, the polysiloxane-polycarobnate copolymer, the polyester, and the carbon black.

The polycarbonate may suitably include a thermoplastic aromatic polycarbonate having a viscosity average molecular weight (Mv) of about 15,000 to 40,000.

The polycarbonate may include a polymer of Formula 1 below:

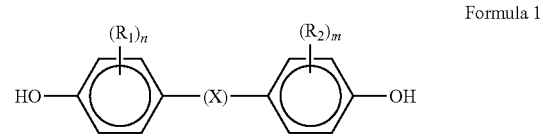

Formula 1 where in (Formula 1 Formula 1, X contains a straight, branched, or cyclic alkylene group, or a straight, branched, or cyclic alkylene group containing one functional group selected from the group consisting of sulfide, ether, sulfoxide, sulfone, ketone, naphthyl, isobutyl phenyl, and combinations thereof, $R_1$ and $R_2$ each independently contain a hydrogen atom, a halogen atom, or an alkyl group, and n and m each include an integer of 0 to 4.

The polysiloxane-polycarbonate copolymer may have a viscosity average molecular weight (Mv) of about 15,000 to 200,000, and contain hydroxy terminal siloxane and the polycarbonate at a weight ratio of about 50:50 to 99:1.

The polysiloxane-polycarbonate copolymer may include polymers of Formulas 2 and 3 below:

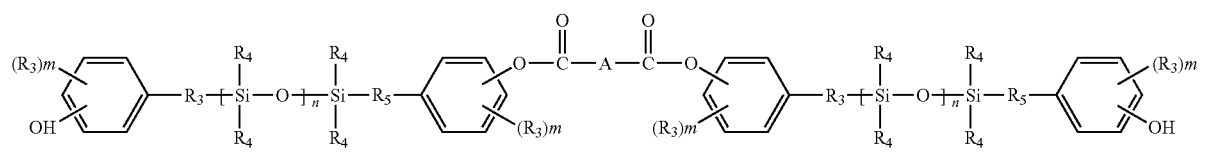

Formula 2 where in Formula 2, $R_3$ independently contains a hydrogen atom, a halogen atom, a hydroxy group, an alkyl group having 1 to 20 carbon atoms, an alkoxy group having 1 to 13 carbon atoms, or an aryl group having 6 to 10 carbon atoms, and $R_4$ independently contains a hydrocarbon group having 1 to 13 carbon atoms or a hydroxy group, $R_5$ independently contains an alkylene group having 2 to 8 carbon atoms, A refers to X or NH—X—NH, where X is a linear or branched aliphatic group having 1 to 20 carbon atoms, a cycloalkylene group having 3 to 6 carbon atoms, or a mononuclear or polynuclear arylene group having 6 to 30 carbon atoms unsubstituted or substituted with a halogen atom, an alkyl group, an alkoxy group, an aryl group, or a carboxyl group, m includes an integer from 0 to 10, independently, and n includes an integer from 2 to 1,000, independently.

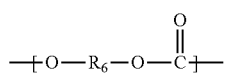

Formula 3 where in Formula 3, $R_6$ contains an alkyl group having 1 to 20 carbon atoms, a cycloalkyl group having 3 to 6 carbon atoms, an alkenyl group having 2 to 13 carbon atoms, an alkoxy group having 1 to 13 carbon atoms, an aromatic hydrocarbon group having 6 to 30 carbon atoms substituted or unsubstituted with a halogen atom, or a nitro.

The polyester may have a melt temperature of about 215 to 235° C. and an intrinsic viscosity (IV) of about 0.45 to 1.6 $d\ell/g$.

The polyester may suitably include one or more selected from the group consisting of polyethylene terephthalate, polypropylene terephthalate, and polybutylene terephthalate.

The master batch may include the carbon black and the polycarbonate.

The master batch may include an amount of about 10% by weight to 40% by weight of the carbon black, and an amount of about 60% by weight to 90% by weight of the polycarbonate, based on the total weight of the master batch.

The additive may include a gloss-reducing agent and an impact-reinforcing agent.

The gloss-reducing agent may include an ASA-based graft copolymer having a core-shell structure, the ASA-based graft copolymer may include an amount of about 30% by weight to 80% by weight of a core and an amount of about 20% by weight to 70% by weight of a shell, based on the total weight of the gloss-reducing agent. The core of the ASA-based graft copolymer may suitably include acrylic rubber, and the shell of the ASA-based graft copolymer may suitably include a vinyl-based graft copolymer.

The impact-reinforcing agent may include an MBS-based graft copolymer having a core-shell structure. The core of the MBS-based graft copolymer may suitably include polybutadiene, and the shell of the MBS-based graft copolymer may suitably include one or more selected from the group consisting of alkyl methacrylate, and alkyl acrylate.

The thermoplastic resin composition may suitably include an amount of about 10% by weight to 65% by weight of a polycarbonate, an amount of about 10% by weight to 45% by weight of a polysiloxane-polycarbonate copolymer, an amount of about 10% by weight to 45% by weight of a polyester, an amount of about 1.5% by weight to 8.5% by weight of a carbon black, an amount of about 5% by weight to 25% by weight of a gloss-reducing agent, and an amount of about 1% by weight to 10% by weight of an impact-reinforcing agent, based on the total weight of the thermoplastic resin composition.

The additive may further include: one or more auxiliary agents selected from the group consisting of inorganic fillers, lubricants, antioxidants, light stabilizers, hydrolysis stabilizers, mold release agents, colorants, ultraviolet stabilizers, antistatic agents, conductivity imparting agents, magnetism imparting agents, cross-linking agents, antibacterial agents, processing aids, anti-frictional agents, anti-wear agents, and coupling agents.

The thermoplastic resin composition may include the auxiliary agent in an amount of about 0.1 parts by weight to 2 parts by weight based on 100 parts by weight of the polycarbonate.

In an aspect, provided is a method for manufacturing a molded article including manufacturing a pellet by melting and extruding the thermoplastic resin composition as described herein; and manufacturing a molded article by molding the pellet.

In an aspect, provided is a molded article manufactured by the manufacturing method, in which a 20° (degree) specular glossiness based on ISO 2813 is 2.5 to 3.0.

Further provided is a vehicle including the molded article as described herein.

The thermoplastic resin composition and the vehicle molded article including the same, which may be used for the non-coating interior and exterior materials for the vehicle or the like, may exhibit the improved chemical resistance, hydrolysis resistance, and light resistance while satisfying the mechanical properties such as impact resistance and heat resistance and have the excellent injection appearance.

The effects of the present invention are not limited to the aforementioned effects. It should be understood that the effects of the present invention include all effects which may be inferred from the following description.

The other aspects of the invention are discussed infra.

DETAILED DESCRIPTION

As described above, objects, other objects, features, and advantages according to the present invention will be readily understood through the following preferred Examples associated with the accompanying drawings. However, the present invention is not limited to the Examples described herein and may also be embodied in other forms. Rather, the Examples introduced herein are provided so that the invention may be made thorough and complete, and the spirit according to the present invention may be sufficiently conveyed to those skilled in the art.

In this specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof in advance. Further, when a portion such as a layer, a film, an area, or a plate is said to be "on" another portion, this includes not only the case where the portion is "directly above" another portion but also the case where there are other portions there between. Conversely, when a portion such as a layer, a film, an area, or a plate is said to be "under" another portion, this includes not only the case where the portion is "directly under" another portion but also there are other portions there between.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, where a numerical range is disclosed herein, such a range is continuous, and includes unless otherwise indicated, every value from the minimum value to and including the maximum value of such range. Still further, where such a range refers to integers, unless otherwise indicated, every integer from the minimum value to and including the maximum value is included.

In the present specification, if a range is described for a variable, it will be understood that the variable includes all values within the described range including the described endpoints of the range. For example, it will be understood that a range of "5 to 10" includes not only values of 5, 6, 7, 8, 9, and 10 but also any sub-range such as 6 to 10, 7 to 10, 6 to 9, and 7 to 9, and also includes any value between reasonable integers within the scope of the described ranges such as 5.5, 6.5, 7.5, 5.5 to 8.5, 6.5 to 9, and the like. Further, it will be understood that a range of "10% to 30%" includes, for example, not only all integers including values, such as 10%, 11%, 12%, and 13%, and 30% but also any sub-range such as 10% to 15%, 12% to 18%, and 20% to 30%, and also includes any value between reasonable integers within the scope of the described range, such as 10.5%, 15.5%, and 25.5%.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Provided are, inter alia, i) a thermoplastic resin composition which includes polycarbonate, polysiloxane-polycarbonate copolymer, polyester, carbon black, and optionally further includes additives, ii) a method for manufacturing a molded article manufactured by using the thermoplastic resin composition, and iii) the molded article which is manufactured through the manufacturing method.

Hereinafter, each composition contained in the thermoplastic resin composition according to the present invention will be described, and the content relationship of these compositions will be described.

Polycarbonate

The polycarbonate may include an aromatic polycarbonate resin, and may suitably include a thermoplastic aromatic polycarbonate resin.

The polycarbonate has a viscosity average molecular weight (Mv), measured in a 25° C. methylene chloride solution, of about 15,000 to 40,000, of about 17,000 to 30,000, or particularly of about 20,000 to 30,000. When the viscosity average molecular weight of the polycarbonate is less than 15,000, the mechanical properties such as the impact strength and tensile strength of the molded article may be significantly decreased, and when the viscosity average molecular weight of the polycarbonate is greater than about 40,000, a problem may occur in the processing of the resin due to an increase in melt viscosity.

The polycarbonate may suitably include the polymer of Formula 1 below.

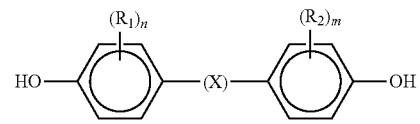

Formula 1

In Formula 1, X contains a straight, branched, or cyclic alkylene group, or a straight, branched, or cyclic alkylene group containing one functional group selected from the group consisting of sulfide, ether, sulfoxide, sulfone, ketone, naphthyl, or isobutylphenyl, $R_1$ and $R_2$ each independently contain a hydrogen atom, a halogen atom, or an alkyl group, and n and m each include an integer of 0 to 4.

The thermoplastic resin composition may suitably include an amount of about 10% by weight to 65% by weight of the polycarbonate, or particularly an amount of about 25% by weight to 55% by weight thereof, based on the total weight of the thermoplastic resin composition. When the content of the polycarbonate is less than about 10% by weight, the effect of improving properties such as transparency, fluidity, heat resistance, and room temperature impact strength may not be sufficient, and conversely, when the content of the polycarbonate is greater than about 65% by weight, flame retardancy, low-temperature impact strength, and the like may be decreased.

Polysiloxane-Polycarbonate Copolymer

The polysiloxane-polycarbonate copolymer may include a copolymer polymer containing hydroxy terminal siloxane and polycarbonate.

The polysiloxane-polycarbonate copolymer may have a viscosity average molecular weight, measured in a 25° C. methylene chloride solution, of about 15,000 to 200,000, or particularly of about 15,000 to 70,000. When the viscosity average molecular weight is less than about 15,000, the mechanical properties of the molded article may be significantly decreased, and when the viscosity average molecular weight is greater than about 200,000, a problem may occur in the processing of the resin due to an increase in melt viscosity.

The polysiloxane-polycarbonate copolymer may suitably include hydroxyterminal siloxane and polycarbonate at a weight ratio of about 50:50 to 99:1. When the relative content of the siloxane portion is less than the weight ratio, the flame retardancy and low-temperature impact strength may be decreased, and conversely, when the relative content of the siloxane portion is greater than the weight ratio, the properties such as transparency, fluidity, heat resistance, and room temperature impact strength may be decreased and manufacturing costs may be increased due to a decrease in the relative content of the polycarbonate portion.

The polysiloxane-polycarbonate copolymer may include the polymers of the following Formulas 2 and 3.

The polyester may suitably include one or more selected from the group consisting of polyethylene terephthalate, polypropylene terephthalate, and polybutylene terephthalate.

The thermoplastic resin composition may suitably include the polyester in an amount of about 10% by weight to 45% by weight, or particularly in an amount of about 10% by Formula 2

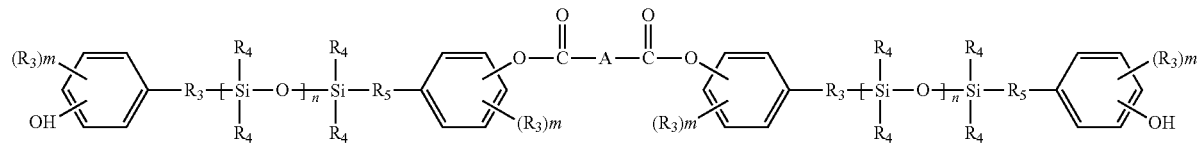

In Formula 2, $R_3$ independently contains a hydrogen atom, a halogen atom, a hydroxy group, an alkyl group having 1 to 20 carbon atoms, an alkoxy group having 1 to 13 carbon atoms, or an aryl group having 6 to 10 carbon atoms, and $R_4$ independently contains a hydrocarbon group having 1 to 13 carbon atoms or a hydroxy group, $R_5$ independently contains an alkylene group having 2 to 8 carbon atoms, A refers to X or NH—X—NH, where X is a linear or branched aliphatic group having 1 to 20 carbon atoms, a cycloalkylene group having 3 to 6 carbon atoms, or a mononuclear or polynuclear arylene group having 6 to 30 carbon atoms unsubstituted or substituted with a halogen atom, an alkyl group, an alkoxy group, an aryl group, or a carboxyl group, m includes an integer from 0 to 10, independently, and independently includes an integer from 2 to 1,000.

Formula 3

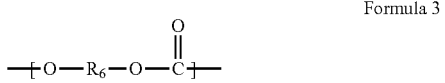

In Formula 3, $R_6$ contains an alkyl group having 1 to 20 carbon atoms, a cycloalkyl group having 3 to 6 carbon atoms, an alkenyl group having 2 to 13 carbon atoms, an alkoxy group having 1 to 13 carbon atoms, an aromatic hydrocarbon group having 6 to 30 carbon atoms substituted or unsubstituted with a halogen atom, or a nitro.

The thermoplastic resin composition may suitably include an amount of about 10% by weight to 45% by weight of the polysiloxane-polycarbonate copolymer, or particularly an amount of about 15% by weight to 40% by weight thereof, based on the total weight of the thermoplastic resin composition. When the content of the polysiloxane-polycarbonate copolymer is less than about 10% by weight, the effect of improving properties such as chemical resistance and impact strength may not be sufficient, and conversely, when the content of the polysiloxane-polycarbonate copolymer is greater than about 45% by weight, heat resistance and color reproducibility may be decreased. Further, the polysiloxane-polycarbonate may be excessively contained, thereby reducing a tensile strength, a flexural strength, a flexural modulus, and the like.

Polyester

The polyester may suitably have a melting temperature of about 215° C. to 235° C., and an intrinsic viscosity (IV) of about 0.45 dℓ/g to 1.6 dℓ/g. Preferably, the intrinsic viscosity of the polyester may be about 0.80 dℓ/g to 1.3 dℓ/g.

weight to 30% by weight based on the total weight of the thermoplastic resin composition. When the content of the polyester is less than about 10% by weight, the effect of improving chemical resistance may not be sufficient, and conversely, when the content of the polyester is greater than about 45% by weight, mechanical properties and color reproducibility may be decreased.

Carbon Black

The carbon black may be added to the thermoplastic resin composition as being compounded into a master batch (MB). The master batch, for example, may include polycarbonate and carbon black, such that the carbon black may be easily dispersed by dispersing the carbon black in the polycarbonate and master batching the same.

The master batch may suitably include an amount of about 10% by weight to 40% by weight of a carbon black, and an amount of about 60% by weight to 90% by weight of a polycarbonate, based on the total weight of the master batch. Preferably, the master batch may include an amount of about 15% by weight to 30% by weight of the carbon black, and an amount of about 70% by weight to 85% by weight of the polycarbonate, based on the total weight of the master batch. When the content of the carbon black in the master batch is less than about 10% by weight, the content of the carbon black may be too small to expect a synergistic effect of light resistance, and when the content of the carbon black in the master batch is greater than about 40% by weight, processability may deteriorate.

The thermoplastic resin composition may suitably include an amount of about 1.5% by weight to 8.5% by weight of the carbon black based on the total weight of the thermoplastic resin composition. The thermoplastic resin composition may preferably include an amount of about 3.5% by weight to 6.5% by weight of the carbon black based on the total weight of the thermoplastic resin composition. When the content of the carbon black is less than about 1.5% by weight, the effect of improving light resistance may not be sufficient, and when the content of the carbon black is greater than about 8.5% by weight, mechanical properties may be decreased.

The carbon black may be suitably added in the form of a master batch, and when the carbon black is added in a form other than the master batch, overall mechanical properties may be decreased and light resistance and low glossiness may be decreased.

Additives

The additives may suitably include a gloss-reducing agent and an impact-reinforcing agent.

The gloss-reducing agent may include an ASA-based graft copolymer, and may have a core-shell structure. At this time, it is preferable that the core in the ASA-based graft copolymer occupies 30% by weight to 80% by weight, the shell is contained in an amount of 20% by weight to 70% by weight, the core contains acrylic-based rubber, and the shell contains a vinyl-based graft copolymer.

A method for polymerizing the ASA-based graft copolymer may use a conventional method known in the art, and for example, emulsion polymerization, suspension polymerization, or the like are possible, and the emulsion polymerization method may be preferably used to increase an average particle diameter of the acrylic rubber configuring the core.

The thermoplastic resin composition may suitably include an amount of about 5% by weight to 25% by weight of the gloss-reducing agent, or particularly an amount of about 10% by weight to 20% by weight thereof based on the total weight of the thermoplastic resin composition. When the content of the gloss-reducing agent is less than about 5% by weight, the effect of improving hydrolysis resistance and low glossiness may not be sufficient, and when the content of the ASA-based graft copolymer is greater than about 25% by weight, formability and heat resistance may be decreased.

The impact-reinforcing agent may suitably include an MBS-based graft copolymer, and may have a core-shell structure. The core may include polybutadiene, and the shell may include one or more selected from the group consisting of alkyl methacrylate and alkyl acrylate.

When the MBS-based graft copolymer is used as the impact-reinforcing agent, there are advantages in that high color reproducibility and thermal stability may be guaranteed, and the process time upon injection molding may be shortened.

The thermoplastic resin composition may suitably include an amount of about 1% by weight to 10% by weight of the impact-reinforcing agent, or particularly an amount of about 5% by weight to 10% by weight thereof, based on the total weight of the thermoplastic resin composition. When the content of the impact-reinforcing agent is less than about 1% by weight, the low glossiness may be decreased (that is, the glossiness may be increased), and the effect of improving the impact strength may not be sufficient. When the content of the impact-reinforcing agent is greater than about 10% by weight, mechanical properties such as a tensile strength, a flexural strength, and a flexural modulus may be decreased.

The additives may further include one or more auxiliary agents selected from the group consisting of inorganic fillers, lubricants, antioxidants, light stabilizers, hydrolysis stabilizers, mold release agents, colorants, ultraviolet stabilizers, antistatic agents, conductivity imparting agents, magnetism imparting agents, cross-linking agents, antibacterial agents, processing aids, anti-frictional agents, anti-wear agents, and coupling agents.

Generally, any material which may be used in the technical field for the thermoplastic resin composition may be sufficient as the auxiliary agent, and for example, the antioxidants may suitably include a phenol type, a phosphite type, a thioether type, an amine type, and the like, the mold release agents may suitably include fluorine-containing polymers, silicone oils, metal salts of stearic acid, metal salts of montanic acid, montanic acid ester waxes, polyethylene waxes, and the like, and the ultraviolet stabilizers may suitably include benzophenol, benzotriazole, amine type, and the like.

The auxiliary agent may be included in an amount of about 0.1 parts by weight to 2 parts by weight based on 100 parts by weight of the polycarbonate.

The thermoplastic resin composition may include a polycarbonate, a polysiloxane-polycarbonate copolymer, a polyester, a master-batched carbon black, a gloss-reducing agent, and an impact-reinforcing agent. The thermoplastic resin composition may suitably include an amount of about 10% by weight to 65% by weight of the polycarbonate, an amount of about 10% by weight to 45% by weight of the polysiloxane-polycarbonate copolymer, an amount of about 10% by weight to 45% by weight of the polyester, an amount of about 1.5% by weight to 8.5% by weight of the master-batched carbon black, an amount of about 5% by weight to 25% by weight of the gloss-reducing agent, and an amount of about 1% by weight to 10% by weight of the impact-reinforcing agent. Preferably, the master match may suitably include an amount of about 10% by weight to 40% by weight of the carbon black and an amount of about 60% by weight to 90% by weight the polycarbonate based on the total weight of the master batch.

Method for Manufacturing a Molded Article

A method for manufacturing a molded article may include manufacturing a pellet by melting and extruding the aforementioned thermoplastic resin composition, and manufacturing a molded article by molding the pellet.

The molding process is not much different from the process of manufacturing a general plastic molded article, and for example, the molding may use injection molding, blow molding, extrusion molding, thermo molding methods, or the like, and is not particularly limited thereto.

No process of melting, extruding, and the like will be particularly limited in the present invention, and a more specific process will be described in the following Examples.

Molded Article

The molded article manufactured by the aforementioned method for manufacturing the molded article may have the advantage of excellent mechanical properties and the like, and particularly, in glossiness. For example, the molded article may have a 20° (degree) specular glossiness based on ISO 2813 of about 2.5 to 3.0.

The effective aspects of the thermoplastic resin composition and the molded article manufactured by the same will be described through the following examples and experimental example results.

Example

Hereinafter, the present invention will be described in more detail through specific examples. However, these examples are intended to illustrate the present invention and the scope of the present invention is not limited by them.

The components used in Examples and Comparative Examples are specifically as follows.

(A) Polycarbonate resin: 3020 PJ (Mv: 21,000) produced by Samyang corporation (B) Polysiloxane-polycarbonate resin: ST4-3022 PJ (Mv: 26,000) produced by Samyang corporation (C) Polyester resin: polybutylene terephthalate intrinsic viscosity 1.1 $d\ell/g$)

(D) ASA-based graft copolymer having a core/shell structure: LI910 produced by LG company (E-1) MBS-based impact-reinforcing agent having a core/shell structure: M732 produced by KANEKA Corporation (E-2) Silicone-based impact-reinforcing agent having a core/shell structure: Rayon S-2001 produced by Mitsubishi Rayon corporation (E-3) Acrylic impact-reinforcing agent having a core/shell structure: EXL2313 produced by R&Hass Corporation ;e'2q(F-1) Carbon black: Raven 2350 Ultra (Birla Carbon corporation) (NSA surface area: 203 m$^2$/g, average particle diameter: 15 nm)

(F-2) Carbon black master batch: a master batch was manufactured by putting the part of the polycarbonate resin and the carbon black into a twin screw extruder (L/D=48, Φ=25 mm, melt temperature of about 240° C., screw RPM of 150 rpm) so that a weight ratio of a part of the polycarbonate resin of (A) and the carbon black of (F-1) becomes 70:30, and extruding, cooling, and cutting the resulting mixture.

Examples 1 to 9

Pellets of Examples 1 to 9 were manufactured by putting the polycarbonate resin (A), the polysiloxane-polycarbonate resin (B), the polyester resin (C), the ASA-based graft copolymer (D), the MBS-based impact-reinforcing agent (E-1), and the carbon black master batch (F-2) into the twin screw extruder (L/D=48, Φ=25 mm, melt temperature of about 240° C., screw RPM of 150 rpm) with the contents described in Table 1 below, and extruding, cooling, and cutting the resulting mixture.

TABLE 1

| Composition | Examples | | | | | | | | |
|---|---|---|---|---|---|---|---|---|---|
| (% by weight) | 1 | 2 | 3 | 4 | 5 | 6 | 7 | 8 | 9 |
| (A) | 41 | 46 | 11 | 51 | 26 | 46 | 26 | 44.5 | 39.5 |
| (B) | 15 | 10 | 45 | 15 | 20 | 15 | 15 | 15 | 15 |
| (C) | 20 | 20 | 20 | 10 | 30 | 20 | 20 | 20 | 20 |
| (D) | 10 | 10 | 10 | 10 | 10 | 5 | 25 | 10 | 10 |
| (E-1) | 5 | 5 | 5 | 5 | 5 | 5 | 5 | 5 | 5 |
| (E-2) | — | — | — | — | — | — | — | — | — |
| (E-3) | — | — | — | — | — | — | — | — | — |
| (F-1) | — | — | — | — | — | — | — | — | — |
| (F-2) | 5 | 5 | 5 | 5 | 5 | 5 | 5 | 1.5 | 6.5 |

Comparative Examples 1 to 13

Pellets of Comparative Examples 1 to 13 were manufactured by putting the polycarbonate resin (A), the polysiloxane-polycarbonate resin (B), the polyester resin (C), the ASA-based graft copolymer (D), the impact-reinforcing agent (E-1, E-2, E-3), and the carbon black (F-1, F-2) into the twin-screw extruder (L/D=48, Φ=25 mm, melting temperature of about 240° C., screw RPM of 150 rpm) with the contents described in Table 2 below, and extruding, cooling, and cutting the resulting mixture.

TABLE 2

| Composition | Comparative Examples | | | | | | | | | | | | |
|---|---|---|---|---|---|---|---|---|---|---|---|---|---|
| (% by weight) | 1 | 2 | 3 | 4 | 5 | 6 | 7 | 8 | 9 | 10 | 11 | 12 | 13 |
| (A) | 41 | 41 | 56 | 6 | 61 | 11 | 51 | 21 | 46 | 37.5 | 46 | 44.5 | 37 |
| (B) | 15 | 15 | — | 50 | 15 | 15 | 15 | 15 | 15 | 15 | 15 | 15 | 15 |
| (C) | 20 | 20 | 20 | 20 | — | 50 | 20 | 20 | 20 | 20 | 20 | 20 | 20 |
| (D) | 10 | 10 | 10 | 10 | 10 | 10 | — | 30 | 10 | 10 | 10 | 10 | 10 |
| (E-1) | — | — | 5 | 5 | 5 | 5 | 5 | 5 | — | 12 | 5 | 5 | 5 |
| (E-2) | 5 | — | — | — | — | — | — | — | — | — | — | — | — |
| (E-3) | — | 5 | — | — | — | — | — | — | — | — | — | — | — |
| (F-1) | — | — | — | — | — | — | — | — | — | — | — | 1.5 | — |
| (F-2) | 5 | 5 | 5 | 5 | 5 | 5 | 5 | 5 | 5 | 1.5 | — | — | 9 |

Experimental Example

Specimens were manufactured by drying the pellets manufactured in Examples and Comparative Examples by hot air at a temperature of 80° C. to 100° C. for 4 hours, and then injection-molding the pellets at a cylinder temperature of 250° C. to 280° C. and a mold temperature of 80° C., and the properties of each manufactured specimen were measured and the results thereof are described in Tables 4 and 5.

The properties of each manufactured specimen were measured by the following method.

(1) Tensile strength: evaluated based on ISO 527

(2) Flexural strength: evaluated based on ISO 178

(3) Flexural modulus: evaluated based on ISO 178

(4) Impact strength: evaluated based on ISO 180 (notch-izod)

(5) Heat distortion temperature (HDT): evaluated with a load of 1.8 MPa based on ISO (6) Surface impact: evaluated based on ISO 6603 (specimen thickness: 2T, drop speed: 4.4 m/s)

(7) Light resistance: Samyang's own measurement (based on ATLAS CI 4000, irradiated amount 1,050 KJ/m$^2$)

(8) Glossiness: evaluation of 20° (degree) specular glossiness based on ISO 2813

(9) Hydrolysis resistance: Samyang's own measurement (85R.H, 85° C., 300 hr impact strength reduction rate)

(10) Chemical resistance: coating material band strip test (7 days) was performed with tensile specimens based on ASTM D638; and the evaluation strength is 1 to 5 and the criteria are described in Table 3 below.

TABLE 3

| Chemical resistance | | | | |
|---|---|---|---|---|
| OK | Edge Crack | Center Crack | Deep Crack | Break |
| 5 | 4 | 3 | 2 | 1 |

TABLE 4

| Properties measurement | Examples | | | | | | | | |
|---|---|---|---|---|---|---|---|---|---|
| | 1 | 2 | 3 | 4 | 5 | 6 | 7 | 8 | 9 |
| (1) | 56 | 58 | 52 | 55 | 58 | 55 | 53 | 57 | 54 |
| (2) | 84 | 85 | 80 | 83 | 86 | 82 | 84 | 85 | 82 |
| (3) | 2100 | 2150 | 2000 | 2100 | 2200 | 2100 | 2150 | 2150 | 2050 |
| (4) | 60 | 58 | 65 | 62 | 56 | 58 | 63 | 61 | 58 |
| (5) | 92 | 91 | 92 | 97 | 89 | 39 | 87 | 93 | 91 |
| (6) | 55 | 52 | 64 | 56 | 50 | 51 | 57 | 57 | 53 |
| (7) | 1.8 | 1.8 | 1.7 | 1.6 | 2.9 | 1.8 | 1.7 | 2.7 | 1.5 |
| (8) | 2.8 | 2.7 | 2.8 | 2.6 | 3 | 2.9 | 2.6 | 3 | 2.5 |
| (9) | 14 | 17 | 11 | 13 | 18 | 21 | 7 | 14 | 15 |
| (10) | 5 | 5 | 5 | 4 | 5 | 5 | 5 | 5 | 5 |

(1): tensile strength,
(2): flexural strength,
(3): flexural modulus,
(4): impact strength,
(5): heat distortion temperature,
(6): surface impact,
(7): light resistance,
(8): glossiness,
(9): hydrolysis resistance,
(10): chemical resistance

TABLE 5

| Properties measurement | Comparative Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| (1) | 54 | 55 | 60 | 45 | 53 | 61 | 56 | 55 | 64 | 50 | 58 | 52 | 47 |
| (2) | 80 | 82 | 87 | 71 | 79 | 86 | 83 | 85 | 89 | 74 | 83 | 78 | 72 |
| (3) | 2100 | 2100 | 2200 | 1800 | 2000 | 2250 | 2050 | 2150 | 2300 | 1950 | 2100 | 2000 | 1850 |
| (4) | 57 | 58 | 50 | 65 | 62 | 47 | 56 | 65 | 15 | 69 | 57 | 59 | 48 |
| (5) | 91 | 91 | 92 | 90 | 117 | 85 | 94 | 83 | 93 | 88 | 91 | 90 | 90 |
| (6) | 52 | 54 | 48 | 67 | 57 | 42 | 48 | 60 | 38 | 67 | 57 | 50 | 49 |
| (7) | 2.4 | 2.2 | 2.2 | 1.7 | 1.5 | 3.8 | 2.5 | 1.7 | 1.8 | 2.4 | 4.5 | 2.4 | 1.4 |
| (8) | 3.2 | 3.3 | 2.9 | 3.4 | 3.2 | 2.7 | 3.1 | 2.4 | 3.3 | 3 | 3.9 | 2.9 | 2.4 |
| (9) | 15 | 15 | 19 | 10 | 14 | 22 | 28 | 6 | 14 | 16 | 14 | 15 | 15 |
| (10) | 5 | 4 | 3 | 5 | 1 | 5 | 4 | 5 | 5 | 3 | 3 | 5 | 5 |

(1): tensile strength,
(2): flexural strength,
(3): flexural modulus,
(4): impact strength,
(5): heat distortion temperature,
(6): surface impact,
(7): light resistance,
(8): glossiness,
(9): hydrolysis resistance,
(10): chemical resistance As shown in the experimental results of the Examples and the Comparative Examples in Tables 4 and 5, the resin compositions according to Examples 1 to 9 had the excellent and balanced characteristics all in the mechanical properties, such as the chemical resistance, the tensile strength, the flexural strength, the impact strength, and the surface impact, the light resistance, the hydrolysis resistance, and the low glossiness as compared to the resin compositions presented by the Comparative Examples. Particularly, all compositions implemented excellent light resistance of 3 or less and excellent low glossiness of 3 or less.

On the other hand, Comparative Examples 1 and 2 had the decreased glossiness by using another based-impact-reinforcing agent rather than the MBS-based impact-reinforcing agent. Comparative Examples 3 and 5 showed very low chemical resistance and were insufficient to be applied as a non-coating material, and in Comparative Example 9, the impact-reinforcing agent was not added, and thus the impact strength was significantly decreased. In Comparative Examples 4 and 10, the tensile strength, the flexural strength, and the flexural modulus were very low due to the high content of polysiloxane-polycarbonate resin and impact-reinforcing agent. In Comparative Example 6, the impact strength and the light resistance were decreased due to the high content of the polyester resin as compared to Example 1 and in Comparative Example 6, the impact strength and the light resistance were decreased due to the high content of the polyester resin as compared to Example 1. In Comparative Example 7, the ASA-based graft copolymer having the core/shell structure was not added, and thus the hydrolysis resistance was significantly decreased as compared to Example 1. To the contrary, in Comparative Example 8, the ASA-based graft copolymer having the core/shell structure was added in excess, and thus the heat resistance was decreased. In Comparative Example 12, dispersibility was decreased by adding the carbon black having no form of the master batch, and thus overall mechanical properties, the light resistance, and the glossiness resistance were decreased. In Comparative Example 11, the carbon black master batch was not added, and thus the light resistance was decreased, and in Comparative Example 13, the carbon black master batch was added in excess, thereby generally exhibiting low mechanical properties.

Accordingly, the thermoplastic resin composition according to various exemplary embodiments of the present invention may obtain the improved chemical resistance, light resistance, hydrolysis resistance, low glossiness, mechanical properties, and the like without going through a separate post-treatment process to improve the chemical resistance of the molded article. As such, the thermoplastic resin composition may be suitable as a material of the molded article for vehicles and electrical and electronics, and particularly, for non-coating interior materials for the vehicle.

What is claimed is:

1. A thermoplastic resin composition comprising:
   a polycarbonate;
   a polysiloxane-polycarbonate copolymer;
   a polyester;
   a gloss-reducing agent;
   an impact-reinforcing agent; and
   a carbon black,
   wherein the carbon black is compounded into a master batch (MB),
   the master batch comprises the carbon black and the polycarbonate, and
     the master batch comprises an amount of about 10% by weight to 40% by weight of the carbon black and an amount of about 60% by weight to 90% by weight of the polycarbonate, based on the total weight of the master batch,
   wherein the thermoplastic resin composition comprises,
   an amount of about 10% by weight to 65% by weight of the polycarbonate,
   an amount of about 10% by weight to 45% by weight of the polysiloxane-polycarbonate copolymer,
   an amount of about 10% by weight to 45% by weight of the polyester,
   an amount of about 5% by weight to 25% by weight of the gloss-reducing agent,
   an amount of about 1% by weight to 10% by weight of the impact-reinforcing agent, and
   an amount of about 1.5% by weight to 8.5% by weight of the carbon black, based on the total weight of the thermoplastic resin composition,
   wherein the gloss-reducing agent comprises an ASA (acrylonitrile styrene acrylate)-based graft copolymer having a core-shell structure,
   wherein the impact-reinforcing agent comprises an MBS (methyl methacrylate butadiene styrene)-based graft copolymer having a core-shell structure.

2. The thermoplastic resin composition of claim 1, wherein the polycarbonate is a thermoplastic aromatic polycarbonate having a viscosity average molecular weight (Mv) of about 15,000 to 40,000.

3. The thermoplastic resin composition of claim 1, wherein the polycarbonate comprises a polymer of Formula 1 below:

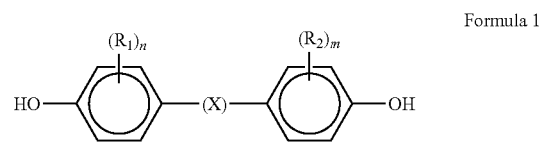

Formula 1 where in Formula 1, X comprises a straight, branched, or cyclic alkylene group, or a straight, branched, or cyclic alkylene group comprising one functional group selected from the group consisting of sulfide, ether, sulfoxide, sulfone, ketone, naphthyl, isobutyl phenyl, and combinations thereof, $R_1$ and $R_2$ each independently comprise a hydrogen atom, a halogen atom, or an alkyl group, and n and m each comprise an integer of 0 to 4.

4. The thermoplastic resin composition of claim 1, wherein the polysiloxane-polycarbonate copolymer has a viscosity average molecular weight (Mv) of about 15,000 to 200,000, and
   comprises hydroxy terminal siloxane and the polycarbonate at a weight ratio of about 50:50 to 99:1.

5. The thermoplastic resin composition of claim 1, wherein the polysiloxane-polycarbonate copolymer comprises polymers of Formulas 2 and 3 below:

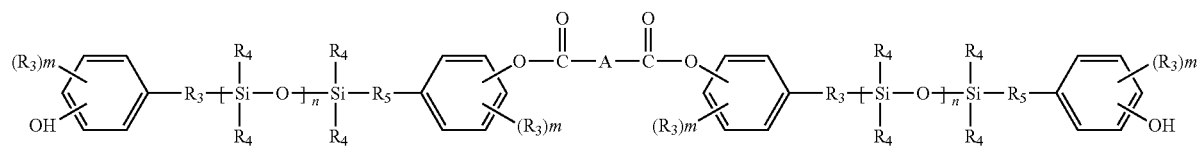

Formula 2 where in Formula 2, $R_3$ independently comprises a hydrogen atom, a halogen atom, a hydroxy group, an alkyl group having 1 to 20 carbon atoms, an alkoxy group having 1 to 13 carbon atoms, or an aryl group having 6 to 10 carbon atoms, and $R_4$ independently comprises a hydrocarbon group having 1 to 13 carbon atoms or a hydroxy group, $R_5$ independently comprises an alkylene group having 2 to 8 carbon atoms, A refers to X or NH-X-NH, where X is a linear or branched aliphatic group having 1 to 20 carbon atoms, a cycloalkylene group having 3 to 6 carbon atoms, or a mononuclear or polynuclear arylene group having 6 to 30 carbon atoms unsubstituted or substituted with a halogen atom, an alkyl group, an alkoxy group, an aryl group, or a carboxyl group, m comprises an integer from 0 to 10, independently, and independently comprises an integer from 2 to 1,000:

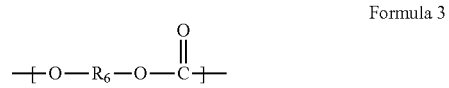

Formula 3 where in Formula 3, $R_6$ comprises an alkyl group having 1 to 20 carbon atoms, a cycloalkyl group having 3 to 6 carbon atoms, an alkenyl group having 2 to 13 carbon atoms, an alkoxy group having 1 to 13 carbon atoms, an aromatic hydrocarbon group having 6 to 30 carbon atoms substituted or unsubstituted with a halogen atom, or a nitro.

6. The thermoplastic resin composition of claim 1, wherein the polyester has a melt temperature of about 215 to 235° C. and an intrinsic viscosity (IV) of about 0.45 to 1.6 dℓ/g.

7. The thermoplastic resin composition of claim 1, wherein the polyester comprises one or more selected from the group consisting of polyethylene terephthalate, polypropylene terephthalate, and polybutylene terephthalate.

8. The thermoplastic resin composition of claim 1, wherein the ASA-based graft copolymer comprises an amount of about 30% by weight to 80% by weight of a core and an amount of about 20% by weight to 70% by weight of a shell, based on the total weight of the ASA-based graft copolymer, wherein the core of the ASA-based graft copolymer comprises an acrylic rubber, and wherein the shell of the ASA-based graft copolymer comprises a vinyl-based graft copolymer.

9. The thermoplastic resin composition of claim 1, wherein the core of the MBS-based graft copolymer comprises polybutadiene, and wherein the shell of the MBS-based graft copolymer comprises one or more selected from the group consisting of alkyl methacrylate and alkyl acrylate.

10. The thermoplastic resin composition of claim 1, further comprising an additive, wherein the additive further comprises: one or more auxiliary agents selected from the group consisting of inorganic fillers, lubricants, antioxidants, light stabilizers, hydrolysis stabilizers, mold release agents, colorants, ultraviolet stabilizers, antistatic agents, conductivity imparting agents, magnetism imparting agents, cross-linking agents, antibacterial agents, processing aids, anti-frictional agents, anti-wear agents, and coupling agents.

11. The thermoplastic resin composition of claim 10, wherein the thermoplastic resin composition comprises the auxiliary agent in an amount of about 0.1 parts by weight to 2 parts by weight based on 100 parts by weight of the polycarbonate.

12. A method for manufacturing a molded article, the method comprising:

manufacturing a pellet by melting and extruding a thermoplastic resin composition of claim 1; and manufacturing a molded article by molding the pellet.

13. A molded article manufactured by the manufacturing method of claim 12, wherein a 20° specular glossiness based on ISO 2813 is about 2.5 to 3.0.

14. A vehicle comprising a molded article of claim 12.

* * * * *